(12) United States Patent
Stamenkovic et al.

(10) Patent No.: US 8,178,463 B2
(45) Date of Patent: May 15, 2012

(54) HIGHLY DURABLE NANOSCALE ELECTROCATALYST BASED ON CORE SHELL PARTICLES

(75) Inventors: Vojislav Stamenkovic, Naperville, IL (US); Nenad M. Markovic, Hinsdale, IL (US); Chao Wang, Chicago, IL (US); Hideo Daimon, Osaka (JP); Shouheng Sun, Providence, RI (US)

(73) Assignee: UChicago Argonne, LLC, Chicago, IL (US)

( * ) Notice: Subject to any disclaimer, the term of this patent is extended or adjusted under 35 U.S.C. 154(b) by 57 days.

(21) Appl. No.: 12/754,323

(22) Filed: Apr. 5, 2010

(65) Prior Publication Data

US 2011/0245068 A1    Oct. 6, 2011

(51) Int. Cl.
| H01M 4/88 | (2006.01) |
| H01M 4/02 | (2006.01) |
| H01M 4/36 | (2006.01) |
| H01M 4/92 | (2006.01) |
| H01M 4/90 | (2006.01) |
| B01J 21/18 | (2006.01) |
| B01J 23/00 | (2006.01) |
| B01J 23/40 | (2006.01) |
| C22C 5/04 | (2006.01) |
| C22C 5/02 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| B32B 15/00 | (2006.01) |
| B22F 7/00 | (2006.01) |
| B22F 7/02 | (2006.01) |
| B22F 1/02 | (2006.01) |
| B23K 35/36 | (2006.01) |
| C25D 5/10 | (2006.01) |

(52) U.S. Cl. ........ 502/101; 502/184; 502/185; 420/466; 420/507; 420/510; 420/512; 428/548; 428/570; 428/615; 428/403; 429/524; 429/527; 977/773; 977/810; 977/948

(58) Field of Classification Search .......... 502/184, 502/185, 101; 420/466, 507, 510, 512; 428/548, 428/570, 615, 403; 429/524, 527; 977/773, 977/810, 948
See application file for complete search history.

(56) References Cited

U.S. PATENT DOCUMENTS 5,759,944 A * 6/1998 Buchanan et al. ............ 502/185
(Continued)

OTHER PUBLICATIONS

"Chemical ordering of FePt nanoparticle self-assemblies by rapid thermal annealing," H. Zeng et al. Journal of Magnetism and Magnetic Materials 266 (2003), pp. 227-232.*

(Continued)

*Primary Examiner* — Patricia L Hailey
(74) *Attorney, Agent, or Firm* — Foley & Lardner LLP

(57) ABSTRACT

A multimetallic nanoscale catalyst having a sore portion enveloped by a shell portion and exhibiting high catalytic activity and improved catalytic durability. In various embodiments, the core/shell nanoparticles comprise a gold particle coated with a catalytically active platinum bimetallic material. The shape of the nanoparticles is substantially defined by the particle shape of the core portion. The nanoparticles may be dispersed on a high surface area substrate for use as a catalyst and is characterized by no significant loss in surface area and specific activity following extended potential cycling.

14 Claims, 12 Drawing Sheets

U.S. PATENT DOCUMENTS

| | | | | |
|---|---|---|---|---|
| 7,053,021 | B1 * | 5/2006 | Zhong et al. | 502/185 |
| 7,208,439 | B2 * | 4/2007 | Zhong et al. | 502/185 |
| 7,288,325 | B2 * | 10/2007 | Eklund et al. | 428/570 |
| 7,704,919 | B2 * | 4/2010 | Adzic et al. | 502/344 |
| 7,855,021 | B2 * | 12/2010 | Adzic et al. | 429/424 |
| 2005/0074612 | A1 * | 4/2005 | Eklund et al. | 428/403 |

OTHER PUBLICATIONS

"Oxygen electrocatalysis in alkaline electrolyte: Pf(hkl), Au(hkl) and the effect of Pd-modification," T. K. Schmidt et al. Electrochimica Acta 47 (2002), pp. 3765-3776.*

"Low temperature magnetic hardening in self-assembled FePt/Ag core-shell nanoparticles," L. Y. Lu et al. Materials Chemistry and Physics 129 (2011), pp. 995-999.*

"Synthesis and characterization of FePt/Au core-shell nanoparticles," P. de la Presa et al. Journal of Magnetism and Magnetic Materials 316 (2007), pp. e753-e755.*

"Magnetic properties of FePtx/Au and CoPtx/Au core-shell nanoparticles," Charles J. O'Connor et al. Journal of Magnetism and Magnetic Materials 226-230 (2001), pp. 1915-1917.*

"Noble metal nanomaterials: Controllable synthesis and application in fuel cells and analytical sensors," Shaojun Guo et al. Nano Today (2011) 6, pp. 240-264.*

"Strategic Synthesis of Trimetallic Au@Pd@Pt Core-Shell Nanoparticles from Poly(vinylpyrrolidone)-Based Aqueous Solution toward Highly Active Electrocatalysts," Liang Wang et al. Chemistry of Materials 2011, 23, pp. 2457-2465.*

"Ptshell0Aucore/C electrocatalyst with a controlled shell thickness and improved Pt utilization for fuel cell reactions," Noel Kristian et al. Electrochemistry Communications 10 (2008), pp. 12-15.*

"AuPt core-shell nanocatalysts with bulk Pt activity," Katrin Hartl et al. Electrochemistry Communications 12 (2010), pp. 1487-1489.*

"Tailoring Au-core Pd-shell Pt-cluster nanoparticles for enhanced electrocatalytic activity," Ping-Ping Fang et al. Chemcial Science 2011, 2, pp. 531-539.*

"Electrocatalytic properties of Au@Pt nanoparticles: effects of Ptshell packing density and Au core size," Binchen Du et al. Phys. Chem. Chem. Phys., 2011, 13, pp. 11568-11574.*

Bengtsson, T., "Dipole Correction for Surface Supercell Calculations", *Physical Review B*, May 15, 1999, pp. 12 301-12 304, vol. 59, No. 19, The American Physical Society.

Kresse et al., "Efficienty of Ab-Initio Total Energy Calculations for Metals and Semiconductors using a Plane-Wave Basis Set", *Computational Materials Science 6*, (1996), pp. 15-50, Elsevier Science B.V.

Vanderbilt, D., "Soft Self-Consistent Pseudopotentials in a Generalized Eigenvalue Formalism", *Rapid Communications, Physical Review B*, Apr. 15, 1990, pp. 7892-7895, The American Physical Society.

Hammer, B., "Improved Adsorption Energetics within Density-Functional Theory using Revised Perdew-Berke-Ernzerhof Functionals", *Physical Review B*, Mar. 15, 1999, pp. 7413-7421, The American Physical Society.

Wang et al., "Multimetallic Au/FePt$_3$ Nanoparticles as Highly Durable Electrocatalyst", *Nano Letters, rec'd for review May 24, 2010*, 9 pages, American Chemical Society.

* cited by examiner

Figure 1A
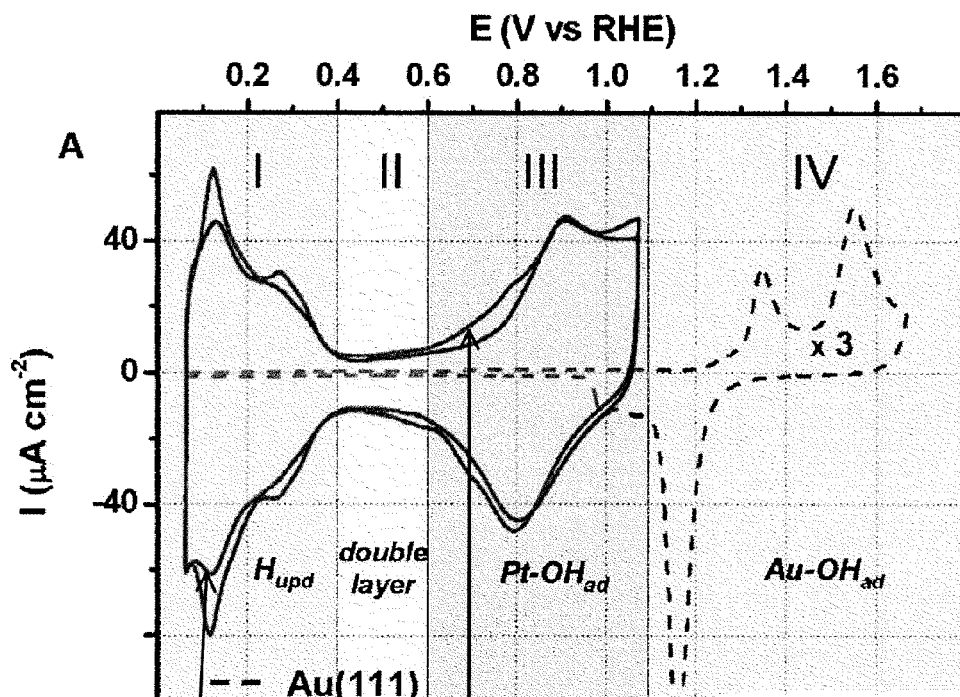
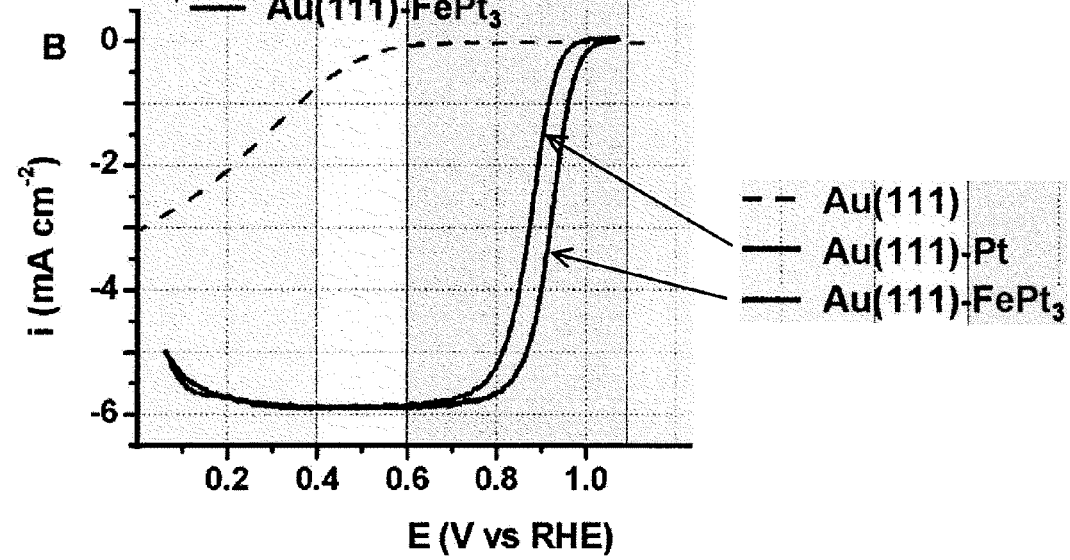
Figure 1B

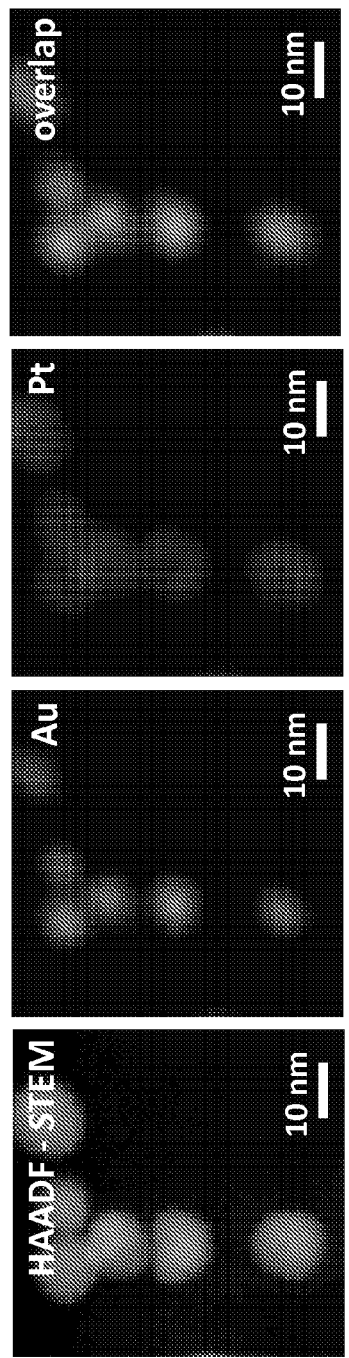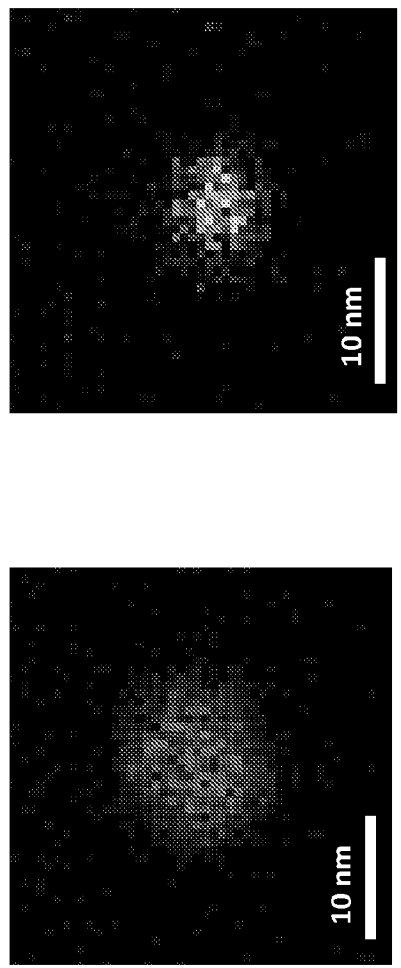
FIGURE 3A
FIGURE 3B
FIGURE 3C

HIGHLY DURABLE NANOSCALE ELECTROCATALYST BASED ON CORE SHELL PARTICLES

STATEMENT OF GOVERNMENT INTEREST

The United States Government claims certain rights in this invention pursuant to Contract No. W-31-109-ENG-38 between the United States Government and the University of Chicago and/or pursuant to DE-ACO2-06CH11357 between the United States Government and U Chicago Argonne, LLC representing Argonne National Laboratory.

FIELD OF THE INVENTION

The present invention relates generally to shape and compositional controlled multi-metallic electrocatalysts. More particularly, the invention is directed to core/shell nanoparticle catalysts having a Platinum (Pt) based bimetallic shell modified for enhanced activity and durability.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Fuel cell technology is considered to be a potential next generation energy solution for powering stationary systems, portable electronic devices, and vehicles. With hydrogen as a fuel, fuel cell technology is environmentally friendly, as it generates electricity from the hydrogen oxidation reaction at the anode and the oxygen reduction reaction (ORR) at the cathode, producing water as the only by-product. Fuel cells are rapidly becoming an important component in the energy industry. Currently, however, costly platinum catalyst is typically a required component of the fuel cell. Replacing expensive platinum as catalyst is a significant challenge for large-scale application of fuel-cell technology. In addition to high cost, substantially pure platinum is neither the most active, nor the most stable catalyst for fuel cell reactions. Specifically, the instability of platinum at the cathode side represents one of the major limitations for commercialization of fuel cell technology.

To make fuel cells commercially competitive at reasonable cost, the amount of platinum used in the fuel cell should be reduced by a factor of four to five. Further, catalyst stability should be improved for longer term operation of the fuel cell. Platinum in the form of nanoparticles dispersed on a high surface area carbon matrix is considered to be the catalyst of choice for the hydrogen oxidation and ORR reactions. Although platinum based alloys embedded in high surface area carbon substrates have been developed that improve catalyst performance by a factor of two, these efforts have not increased catalyst stability, and have not reduced the total loading of platinum in fuel cells to economically feasible levels.

Several efforts have focused on improving the activity of platinum catalysts by alloying platinum with transition metals such as Fe, Co or Ni. For example, extended surfaces of these alloys has achieved enhanced activity that originates from modified electronic structures of platinum, which alters the adsorption of spectator species from the electrolyte and the binding energies of key reaction intermediates, and thus improves the reaction kinetics. Apart from the quest for more active systems, less focus has been placed on the stability of the platinum catalyst. Although, platinum is generally chemically inert, it becomes unstable when exposed to a hostile electrochemical environment such as the ORR. Under such conductions, platinum surface atoms dissolve and migrate, resulting in aggregation of nanoparticles and losses of surface area, activity and power density.

It has been reported that platinum surface sites with low coordination numbers such as step edges, corners, kinks, and adatoms are more vulnerable to dissolution than the atoms that are part of long-range ordered (111) or (100) facets. For example, scanning tunneling microscopy (STM) studies combined with electrochemical and infrared characterizations from platinum single crystal surfaces covered with adsorbed CO has confirmed dissolution. It has also been found that the adsorption of surface oxides occurs on low-coordinated platinum sites. Once formed, the rather strong Pt-oxide interaction induces substantial morphological changes of the topmost surface atoms triggering decay in fuel cell performance.

The instability of platinum at the cathode side represents a major limitation for commercialization of fuel cell technology. As such, there is a need to develop advanced catalytically active materials with not only high activity, but also superior durability and less costly than Pt alone.

SUMMARY OF THE INVENTION

The present invention comprises advanced multimetallic nanoscale catalysts that exhibit high activity and improved durability in, for example, a fuel cell environment. The new catalyst has substantial advantages in that both a high conversion rate and long term stability has been demonstrated for conditions of a fuel cell environment. For instance, after cycling the catalyst for 60,000 cycles (significantly greater than Department of Energy minimum standards) the catalyst described herein showed no significant loss of surface area and specific activity was approximately as high at the end of the cycling as at the beginning. An additional benefit of this catalyst technology is that it uses considerably less platinum, thus, reducing the material cost, while improving catalytic performance and stability. As such, the catalyst described herein has potentially significant value and application across a spectrum of uses.

The present catalytic systems have emerged from comprehensive studies of well-defined surfaces, development of synthetic routes, atomic level characterizations and theoretical modeling. The resulting materials achieve substantial catalytic improvement for the ORR. The approach has also generated insight into the synergy between the various materials and has enabled definition of the role of each constituent in various ternary systems and utilization to synthesize highly active and durable catalytic structures.

A multimetallic structure for fuel cell catalysts has been developed. In an embodiment, the new structure is based on a gold (Au) core coated with a platinum (Pt)-bimetallic shell. In a given example the Pt-bimetallic shell comprises a FePt shell, however, the Pt shell may comprise any of the early transition metals that are known to benefit catalytic activity of the ORR, for example, Ni and Co. The core could also be any of the noble metals including Au, Ag, Cu, Pd, Ru, Rh, Re, etc. The Au core and Pt-bimetallic shell nanostructure has been designed based on knowledge accumulated from analysis of FePt thin films deposited on Au single-crystal substrates, and then synthesized by an organic solvothermal method. Synergy between the shape controlled Au substrate and the beneficial catalytic properties of Pt-bimetallic alloys yields both a highly active and highly durable material. The approach may be extended to other materials to form advanced multimetallic nanoparticles having tailored shape, size, and compositional profiles, which could achieve specific electronic or other material characteristics.

Morphology control and concentration profiles were achieved through the chemical coating of Au seeds of desired shape with a Pt-bimetallic shell. Electrochemical characterization of the samples was then carried out. Compared with state of the art $FePt_3$/C and Pt/C catalysts, the shape controlled (icosahedral) Au/$FePt_3$ catalyst showed unexpectedly superior durability, while preserving the beneficial catalytic activity of Pt-bimetallic alloys. For example, in contrast to cubooctahedral shapes, the geometry of the icosahedral core/shell particles should lead to more desirable distribution of the coordination number of the topmost surface atoms, i.e., the decreased number of corner and edge sites would lead to an increase of the average coordination number, which should diminish surface oxide formation on low coordinated sites.

In an embodiment, a procedure has been developed to incorporate organic-ligand capped metal nanoparticles into a high-surface-area carbon black and to substantially remove the organic ligands (any amphoteric organic molecules ending with $-NH_2$, $-COOH$, $-P$ and other functional groups; primarily oleylamine, oleic acid, trioctylphosphine and trioctylphosphine oxide) from the nanoparticle surface. This process comprises adding the nanoparticles and the carbon black into a hydrophobic organic solvent (primarily hexane, chloroform and ethanol, but can also be any other hydrocarbon based solvents); sonicating the mixture to make a homogeneous suspension of the nanoparticles in contact with the carbon; drying the suspension to obtain a powder of the nanoparticles/carbon mixture; and heating the powder in oxophilic atmosphere (air, oxygen, etc.) at an elevated temperature (e.g., about 150 to about 200° C.). The obtained catalyst is characterized by a clean metal surface and is immediately active for electrochemical reactions. The procedure can readily be extended to other nanomaterials with different composition and surface ligands for various functional applications where a clean surface is required.

These characteristics (high activity and high durability) reveal enormous potential in the utilization of core/shell profiled and shape controlled multimetallic catalysts, in which the addition of the third component has been demonstrated to serve as a supplementary tool in tailoring durability and catalytic properties of the material. The synergistic strategy described herein can also be generalized to other multimetallic nanoparticle systems for various applications. For example, further development could lead to new applications such as lithium air batteries and medical devices. Additionally, the synergistic strategy may also shed light on the connection between fundamental studies and novel nanomaterial synthesis for various functional applications.

In one set of embodiments, an electrocatalyst having enhanced catalytic properties and durability in a fuel-cell environment comprises a plurality of nanoparticles dispersed on a high surface area substrate. Each of the plurality of nanoparticles is characterized by a substantially icosahedral shape that comprises a core portion and a bimetallic shell portion fully encasing the core portion. The core portion comprises a gold nanoparticle and the bimetallic shell portion comprises platinum and a second metal that is configured to alter both a catalytic durability of the nanoparticle and a catalytic activity of the nanoparticle.

In another set of embodiments, a method for forming durable core/shell particles having high catalytic activity comprises providing an amount of gold nanoparticles, reacting an amount of a platinum precursor to obtain platinum, and reacting an amount of an alloying metal precursor to obtain an alloying metal. The alloying metal is selected to enhance the catalytic activity of the platinum in the core/shell particles. A mixture of the platinum, the alloying metal and the gold nanoparticles is heated and then cooled to precipitate a plurality of nanoparticles, each of the nanoparticles is characterized by a core portion and a shell portion enveloping the core portion. The platinum and the alloying metal are preferentially disposed in the shell portion of the core/shell particles.

In yet another set of embodiments, a compositionally modulated nanoparticle for use as a catalytic material comprises a shape controlled seed material characterized by a first particle shape with a diminished number of low coordinated sites, such as an icosohedral shape, for instance. The shape controlled seed material is preferentially disposed in an interior portion of the compositionally modulated nanoparticle. The particles further comprise a catalytically active material forming a periphery surface and a modifier material alloyed with the catalytically active material. The shape of the compositionally modulated nanoparticle is substantially defined by the first particle shape.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1A are cyclic voltammetrics for rotating disk electrode (RDE) characterizations of an Au (111) surface, and Pt and $FePt_3$ thin film surfaces supported on an Au (111) substrate in 0.1M $HClO_4$; FIG. 1B are polarization curves for the materials of FIG. 1A for an ORR at 1600 rpm.

FIG. 3A is an HAADF-STEM characterization and elemental mapping of Au (second image from left), Pt (third image from left) and their overlap in core/shell Au/$FePt_3$ nanoparticles (rightmost image); FIG. 3B is an elemental map of Pt for a single core/shell particle of FIG. 3A; FIG. 3C is an elemental map of Au for a single core/shell particle of FIG. 3A.

DETAILED DESCRIPTION OF VARIOUS EMBODIMENTS

Figure 2A:
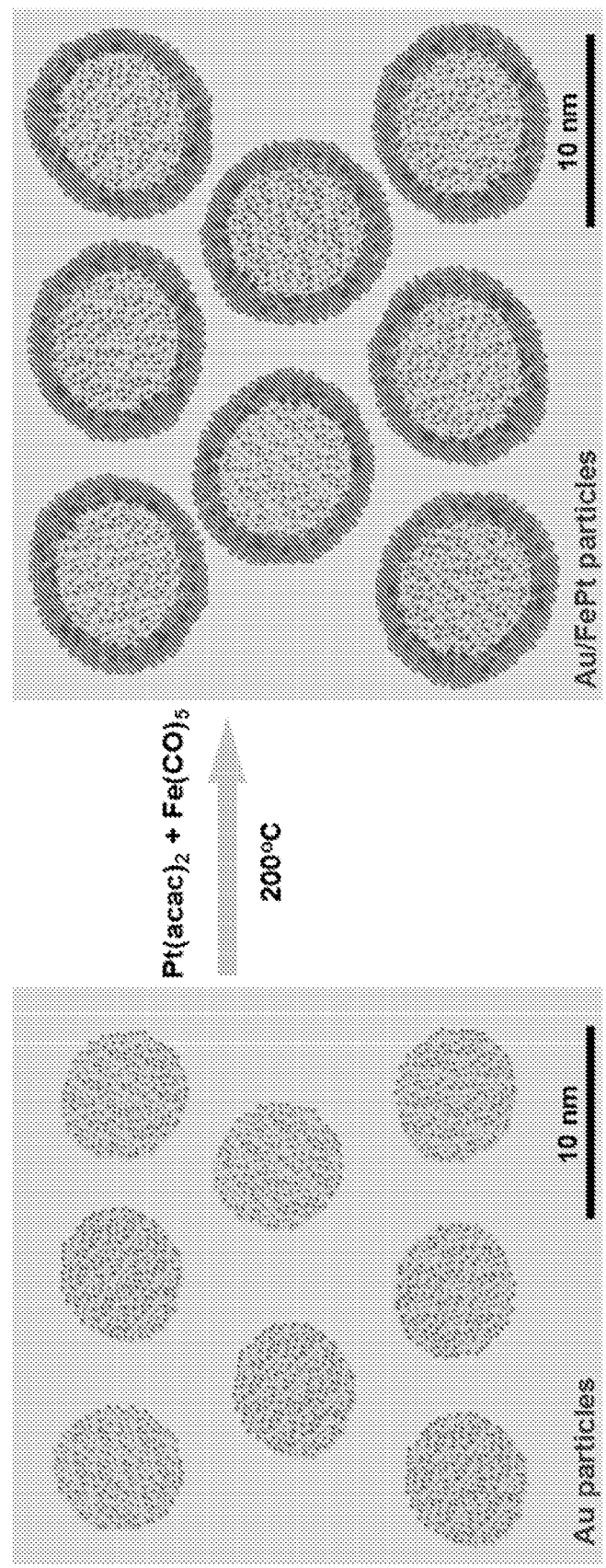
FIG. 2A is a schematic illustrating synthesis of core/shell Au/$FePt_3$ nanoparticles according to an embodiment.
Figure 2B:
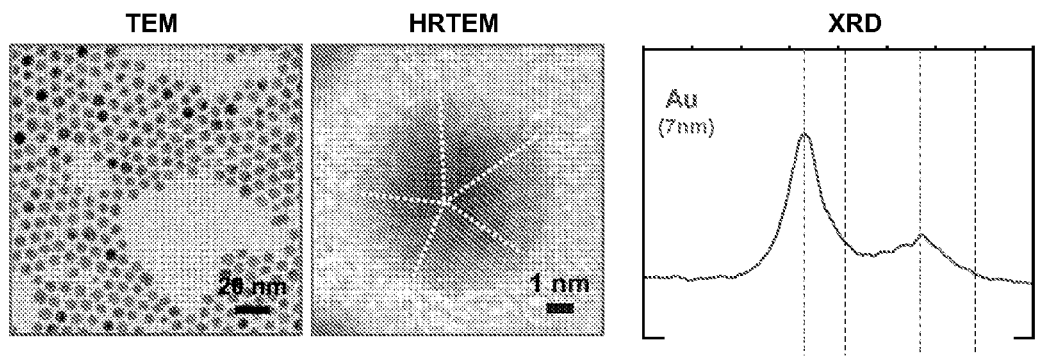
FIGS. 2B-2D are transmission electron microscopy (TEM) (left portion), high resolution transmission electron microscopy (HRTEM) (central portion) and X-ray diffraction (XRD) (right portion) characterizations of 7 nm Au nanoparticles (FIG. 2B); 7/1.5 nm core/shell Au/$FePt_3$ nanoparticles (FIG. 2C); and 10 nm $FePt_3$ nanoparticles (FIG. 2D)
Figure 2C:
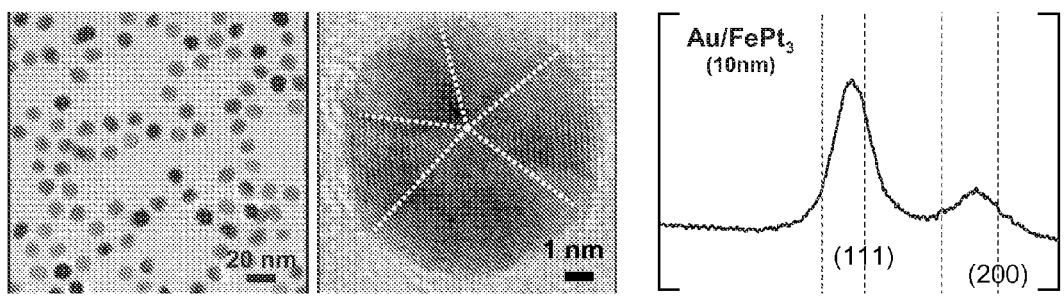

An exemplary embodiment of core/shell Au/FePt nanoparticles according to the present invention is depicted in FIG. 2C. The core/shell Au/FePt nanoparticles are configured with advanced properties for the oxygen reduction reaction (ORR) and may be used in a fuel cell environment. Compared with FePt/C catalyst systems and commercial Pt/C, the core/shell Au/Fat nanoparticles show superior stability with prolonged cycling, while preserving high catalytic activity of Pt-bimetallic alloys. In particular, the initial specific activity of the Au/FePt/C (Au/FePt nanoparticles dispersed in a high surface area carbon substrate) catalyst was as high as FePt/C. Significantly, and in contrast to FePt/C and Pt/C, no significant loss after potential cycling was observed in surface area and specific activity for the Au/Fat/C. After 60,000 potential cycles the Au/FePt/C system was observed to have more than 7 times the activity of the Pt/C system and mass activity of the Au/FePt/C system improved by more than an order of magnitude over the Pt/C system. Although the foregoing results pertain to Au/FePt nanoparticles, the present approach is extendable to other systems, including various catalytically active Pt bimetallic particles.

Desired material characteristics and performance, for example, ORR activity, durability, particle size, particle geometry, etc., of the catalytic nanoparticle systems was initially engineered using well-defined extended surfaces of binary and ternary systems. Nanoparticles implementable in practical systems were then synthesized according those findings. For instance, observed electrochemical behavior of a FePt thin film deposited on an Au (111) extended surface initiated development of synthetic routes aimed to reproduce the system at a nanoscale, i.e., coating of shape controlled Au nanoparticles with a Pt-bimetallic shell. The resulting structures and the synthesis routes to produce the nanoparticles are based on the first principals derived from the systematic studies of well-defined surfaces, synthetic routes and atomic level scale characterizations that could be extended to other materials.

Figure 1C:
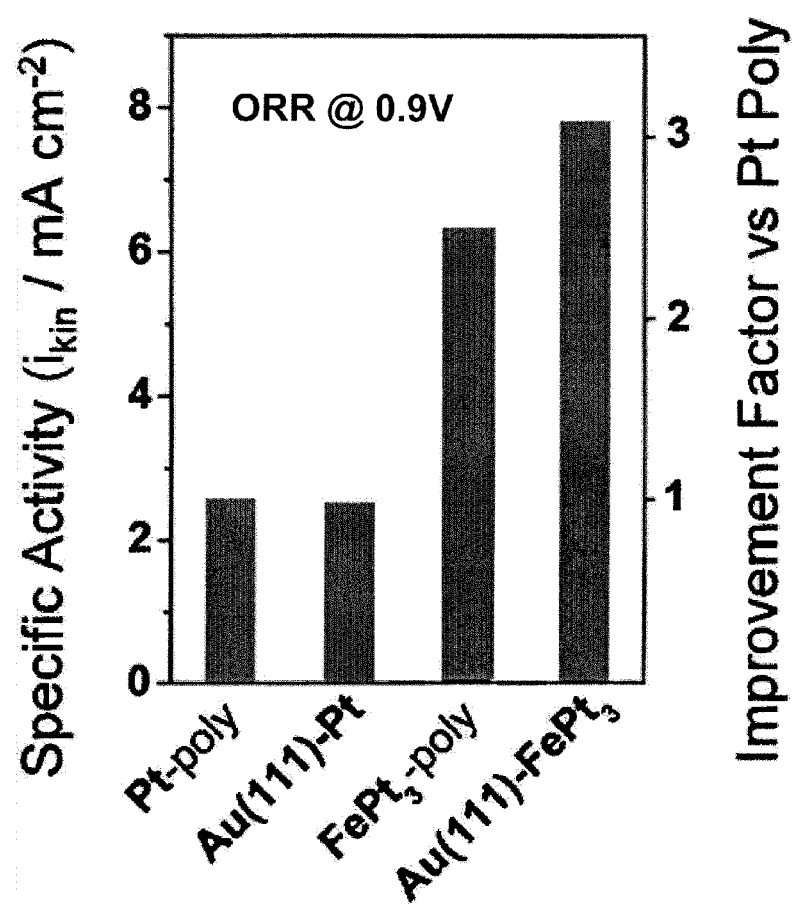
FIG. 1C summarizes the specific activities for the ORR at 0.9 V vs. RHE, at 60° C. with 1600 rpm with a sweep rate of 50 mV/s.

In an embodiment, the present approach is applied in generating advanced multimetallic nanoscale catalysts based on a substantially spherical Au core particle coated with a Pt-bimetallic shell. FIGS. 1A-1C summarize the results from rotating disk electrode (RDE) measurements obtained for well-defined surfaces and demonstrate that, in accordance with the electrochemical property of an individual element, addition of each of the metals induces additional functionality in the catalyst: Au is chemically stable in acidic electrolyte, however, Au is electrochemically inactive for the ORR (E>0.6 V) and inert towards the adsorption/desorption processes of underpotentially deposited hydrogen H$_{upd}$ (Region I of FIGS. 1A and 1B). Although adsorption of surface oxides OH$_{ad}$ does not take place in the potential range of interest for the ORR (Region III of FIGS. 1A and 1B), FIGS. 1A and 1B show adsorption is present in Region IV between 1.2<E<1.6 V. Additionally, when exposed to the acid electrolyte, Fe surface atoms dissolve instantaneously. However, subsurface atoms of transition metals in an alloy with Pt are stable and induce catalytic enhancements for the ORR. Pt is the only metal in this system that adsorbs underpotentially deposited hydrogen (H$_{upd}$) (Region I of FIGS. 1A and 1B) and is active for the ORR with respectable, but less than optimal stability.

The voltametrics depicted in FIG. 1A reveal Pt-like behavior of the Au(111)-Pt and Au(111)-FePt$_3$ thin film surfaces with pronounced Pt-like H$_{upd}$ peaks (Region I), as well as Pt-oxide adsorption/desorption peaks in the potential Region III, 0.6<E<1.1 V. Moreover, the differences in voltammetry between Pt and FePt$_3$ thin film surfaces are clearly visible, i.e., a suppressed H$_{upd}$ region and a positive potential shift of the onset of surface oxide formation for Au(111)-FePt$_3$, which is a well-established behavior of Pt-bimetallic alloy surfaces. With reference to FIG. 1C, this behavior is reflected by substantially improved (three fold) specific catalytic activity for the ORR measured on the Au(111)-FePt$_3$ surface, while there was no change observed in activity between the Pt-poly and Au(111)-Pt electrodes. The observed enhancement of the Au(111)-FePt$_3$ ternary system is in line with FePt$_3$ alloy (FIGS. 1B and 1C). It should be noted that the reported values are expressed in kinetic currents per geometric surface area (not calculated from electrochemical surface area), which provides an additional benefit of having well-defined surfaces as a benchmark for intrinsic specific activities.

Several significant findings emerge from the characterization of these well-defined surfaces. First, the Au substrate does not alter adsorption/electronic and kinetic properties of the outermost Pt atoms. However, addition of Fe atoms in the Pt thin film induces activity enhancement of the ORR through the electronic modification of the topmost Pt atoms. Second, a Pt/Fe film thickness of approximately five atomic layers is sufficient to substantially achieve the behavior of bulk Pt-bimetallic alloys. Further, based on the results depicted in FIG. 1C, a ternary core/thin film system could achieve the high catalytic activity of bulk Pt-bimetallic alloys, while decreasing the total amount of Pt in the system by eliminating buried Pt atoms from the system.

Without limiting the scope of the invention, the noticeable activity boost for Au(111)/FePt$_3$ relative to bulk FePt$_3$ may be induced by the morphology of the substrate. For instance, the growth of FePt$_3$ over Au(111) can lead to the formation of randomly distributed FePt$_3$(111) islands with superior activity. Alternatively, due to the difference in lattice constants between Au and Pt, the strain effect may also play a role in activity enhancement. In addition to the very stable behavior during the ORR characterization, the Pt and FePt$_3$ thin film surfaces over the Au substrate exhibit high stability before, during and after electro-oxidation of fully covered CO adlayers. Moreover, prolonged electrochemical characterizations and further measurements at high overpotentials relevant for the oxygen evolution reaction (>1.6 V vs. RHE) indicate the absence of Au atoms on the surface and the surface composition of Au—FePt$_3$ (and/or Au—Pt) does not change due to the possible diffusion of Au to the surface or thin film degradation.

As previously alluded to, these well-defined extended ternary systems were used as a guide in designing an advanced nanoscale electrocatalyst. For example, it was determined that an electrochemically more inert Au substrate facilitates fine tuning of the stability of the topmost Pt atoms of the system. The Au substrate also replaces buried non-functional Pt atoms, thereby reducing the total mass of Pt in the system. Additionally, it was observed that the multilayered Pt-bimetallic shell-coating governs catalytic properties to the same extent it does in extended Pt-bimetallic systems. Accordingly, core/shell gold/FePt nanoparticles were synthesized to realize the performance benefits observed in the extended surface models. The balance between the relevant factors such as the proper order of synthesis steps, stoichiometric ratio between the elements, and the temperature for shell growth enable formation of nanoparticles with controlled shape, size, and composition profile that preserves beneficial catalytic properties of the Pt-bimetallic alloy surfaces and exhibits superior durability performance, while decreasing the amount of Pt in the system.

In an embodiment, multimetallic core/shell nanoparticles were synthesized using an organic solvothermal approach. Icosahedral shaped Au nanoparticles were prepared via the reduction of chloroauric acid ($HAuCl_4$) by tert-butylamine-borane at about room temperature. The resulting Au nanoparticles were epitaxially coated with $FePt_3$ to form the core/shell nanoparticles. The Au nanoparticles were coated by mixing the particles with platinum acetylacetonate, $Pt(acac)_2$, at 120° C. in the presence of oleic acid and olcylamine, followed by adding $Fe(CO)_5$ that decomposed to Fe. Pt and Fe species nucleated, and with further growth at 200° C., resulted in the $Au/FePt_3$ core/shell nanoparticles. FIG. 2A schematically depicts the synthesis of the core/shell Au/Fat nanoparticles.

The atomic composition of the resulting $Au/FePt_3$ nanoparticles was about: Au 28%, Fe, 17% and Pt 55%. However, the molar ratio of $Fe(CO)_5$ to $Pt(acac)_2$ is selectively adjustable to modulate the atomic composition of the shell portion of the nanoparticles, to fine tune the properties of the particles for, by way of example, catalytic activity and/or durability. For example, with a ratio of 0.8:1 of $Fe(CO)_5$ to $Pt(acac)_2$ yields Fe:Pt of 1:3. Similar synthetic conditions in the absence of Au seeds may be used to obtain Pt and $FePt_3$ nanoparticles of the same size as the core/shell particles (eliminating particle size effects in subsequent comparative characterizations of the particles). As synthesized, the core/shell nanoparticles, and $FePt_3$ particles were respectively incorporated into carbon black (900 $m^2/g$), and the organic surfactants were removed by heating the nanoparticles/carbon mixture in an oxygen rich atmosphere.

Figure 2D:
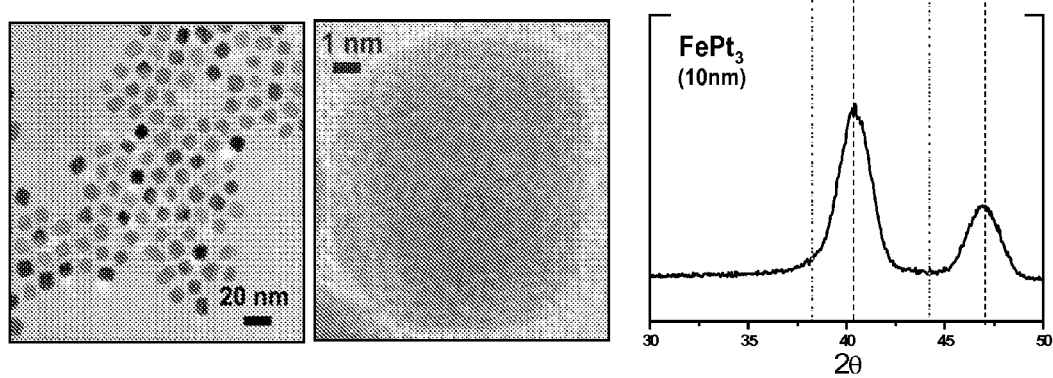

FIGS. 2B-2D depict the morphology, structural properties, and particle size of the Au nanoparticles, $Au/FePt_3$ nanoparticles and the $FePt_3$ nanoparticles, respectively. The standard deviation in size distribution of the as synthesized nanoparticles was determined to be less than 5%. From the representative, transmission electron microscopy (TEM) images (left portion of FIGS. 2B-2D), it was found that the average diameter of the monodispersed Au nanoparticles (FIG. 2B) increased from 7 to 10 nm after coating with the $FePt_3$ particles, indicating that a 1.5 nm thick shell of $FePt_3$ was deposited over the Au seeding nanoparticles (FIG. 2C). High resolution TEM (HRTEM) images (central portion FIGS. 2B-2D) revealed substantial differences in morphology among the particles. The Au nanoparticles shown in FIG. 2B possess an icosahedral shape. The HRTEM images of FIGS. 2B and 2C depict the five-fold symmetry axes and twinning boundaries (marked by dash lines) of the Au and $Au/FePt_3$ nanoparticles. The positions of (111) and (200) peaks for Au and $FePt_3$ are marked with dotted lines respectively in XRD patterns of FIGS. 2B and 2C (right portions). The $FePt_3$ nanoparticles depicted in FIG. 2D have a typical cubo-octahedral shape. However, with reference to FIG. 2C, it is apparent that the icosahedral morphology of the Au seeds is sustained after coating with the $FePt_3$ shell, as evidenced by the presence of a fivefold symmetry axis, the characteristic feature of icosahedral morphology.

Figure 3D:
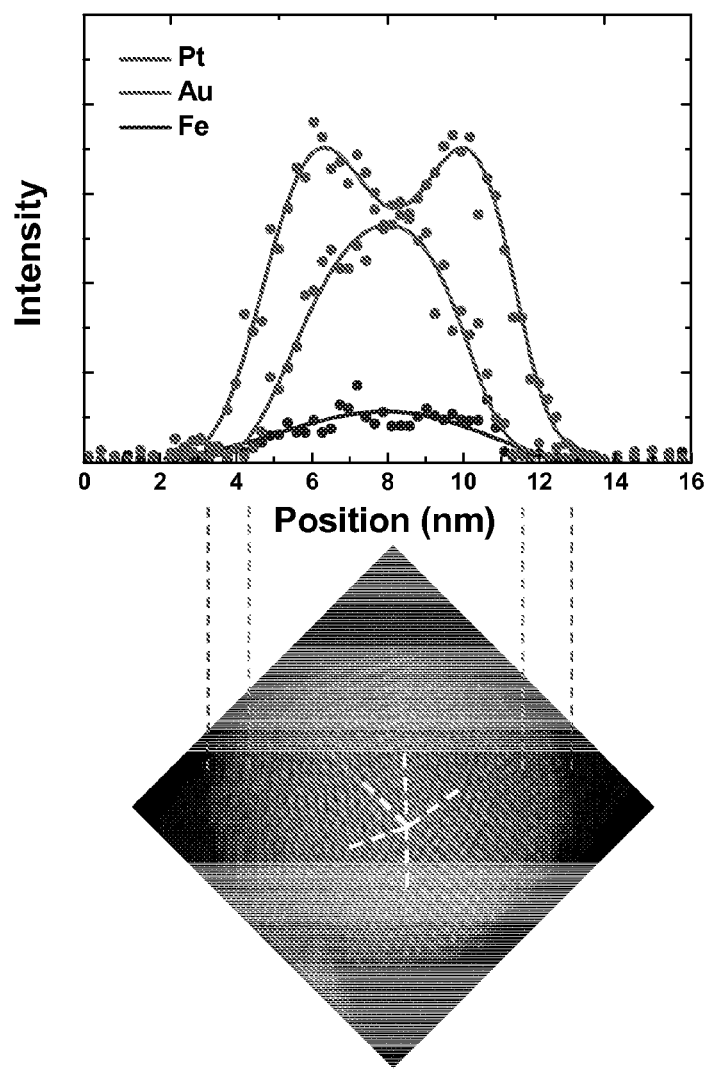
FIG. 3D is a line profile of the elemental distribution of Au, Pt and Fe along a single particle.

The concentration profile of the core/shell particles was established by elemental analysis carried out by scanning transmission electron microscopy (STEM). FIG. 3A shows the high angle annular dark field (HAADF) STEM image and elemental mapping of Au (second image from left) and Pt (third image from left) in the core/shell particles and indicates that an Au core is enveloped by a Pt shell (rightmost image). The signal for Fe is rather weak and mapping of Fe is statistically challenged). FIGS. 3B and 3C present elemental mapping of Pt and Au, respectively, in a single core/shell nanoparticle with a diameter of about 10 nanometers. FIG. 3D shows the line profiles for all three elements (Au, Pt and Fe) obtained by scanning e-beam across the nanoparticle. It can be seen that the Au peak is about 3 nm narrower than the Pt peak, confirming the shell of $PtFe_3$ has a thickness of about 1.5 nm.

The core/shell profile of the particles was also verified by structural and optical characterizations of the $Au/FePt_3$ nanoparticles. The X-ray diffraction (XRD) patterns of the Au seeds, $Au/FePt_3$ and $FePt_3$ nanoparticles have typical peaks of fcc crystals (right portion of FIGS. 2B-2D). A close view of the XRD patterns, shows that the (111) peak of the $Au/FePt_3$ core/shell nanoparticles is downshifted compared to that of the $FePt_3$ nanoparticles, and the distances between the adjacent (111) planes are calculated to be about 0.235 nm, about 0.227 nm and about 0.223 nm for the Au, $Au/FePt_3$ and $FePt_3$ nanoparticles, respectively, according to Bragg's law. A similar trend can also be observed for the (200) peak and other peaks.

This observation implies that the average Pt—Pt bonding length in the core/shell nanoparticles is slightly larger than that in $FePt_3$ nanoparticles. Without limiting the scope of the embodiment, such increase of metallic bonding radius in the $FePt_3$ shell could have two origins. One is the strain effect and the other is caused by alloying at the $Au/FePt_3$ interface where no clear boundary exists and an intermixed phase is formed between the Au core and the $FePt_3$ shell (which has also been confirmed by HAADF STEM analyses). Considering the bonding radius of Au (0.144 nm) is larger than Pt (0.139 nm) and Fe (0.124 nm), such interfacial alloying would also increase the Pt—Pt bonding length in the shell. Additionally, optical properties of $Au/FePt_3$ nanoparticles were investigated by UV-Vis spectroscopy. The 7 nm Au nanoparticles have a strong surface plasmonic absorption peak at 520 nm. In contrast, the $Au/FePt_3$ nanoparticles show a featureless spectrum similar to the $FePt_3$ nanoparticles. This, plus the elemental analysis, establishes that the Au core is entirely coated by the $FePt_3$ shell of the $Au/FePt_3$ nanoparticles.

Figure 4B:
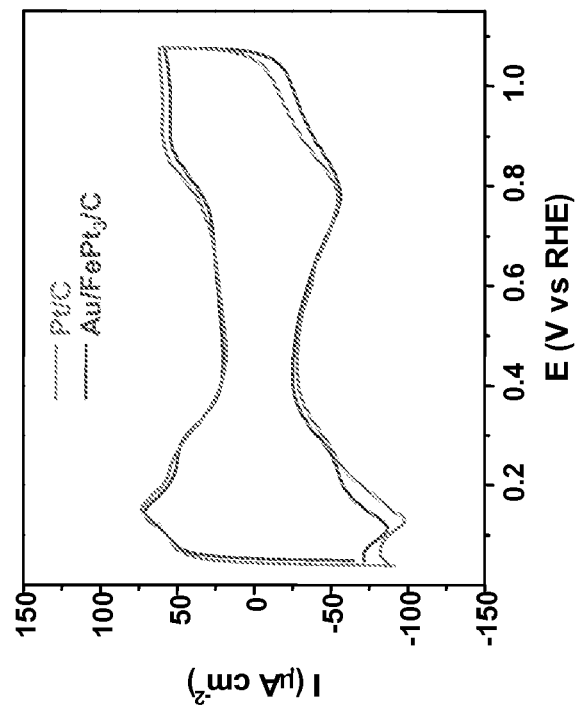
FIG. 4B are cyclic voltammetries showing electrochemical RDE characterization of Pt/C and Au/$FePt_3$/C catalysts in 0.1M $HClO_4$.
Figure 4A:
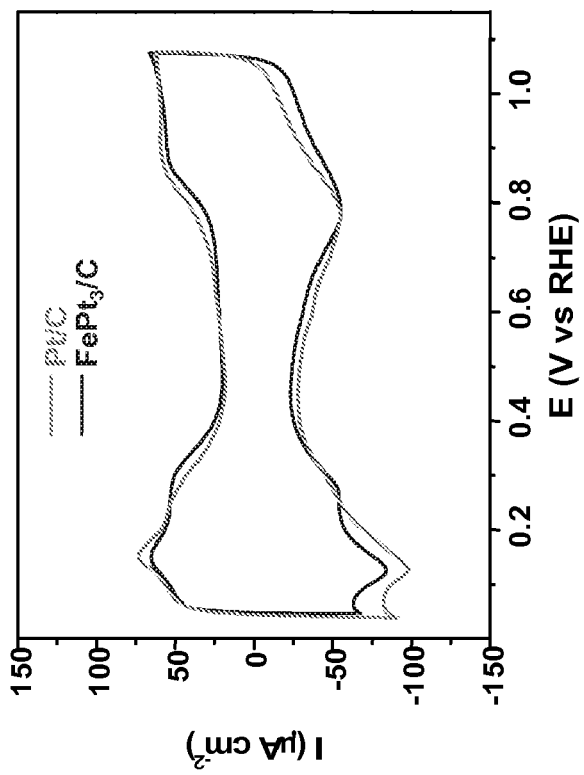
FIG. 4A are cyclic voltammetries showing electrochemical RDE characterization of Pt/C and $FePt_3$/C catalysts in 0.1M $HClO_4$.
Figures 4C, 4D:
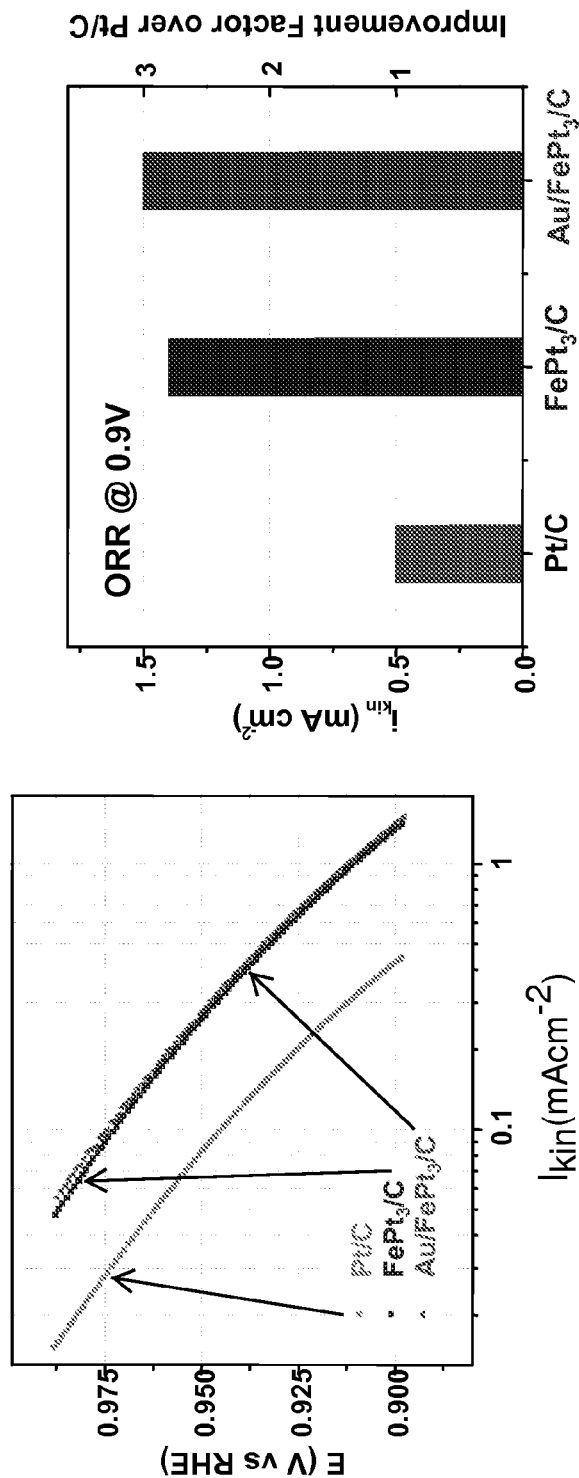
FIG. 4C is a plot of specific activities at 1600 rpm for the ORR at different electrode potentials (Tafel plot) of the catalysts of FIGS. 4A and 4B.
FIG. 4D is a plot summarizing the specific activities for the ORR at 0.9 V vs. RHE, at 60° C. and 1600 rpm with a sweep rate of 50 mV/s.

Electrochemical characterization of the nanoparticles was done by RDE with a glassy carbon disk. With references to FIGS. 4A and 4B, the cyclic voltammetrics for Pt/C, $FePt_3$/C and $Au/FePt_3$/C are depicted. FIG. 4B demonstrates that the $Au/FePt_3$ nanoparticles behave substantially identical to the Pt and $FePt_3$ nanoparticles, indicating that the core/shell particles have a Pt-rich surface. FIG. 4C shows the Tafel plots of the three catalysts investigated by RDE. The activity values and relative improvement factors for the various nanoparticle materials are depicted in FIG. 4D. The catalytic performance of $Au/FePt_3$/C for the ORR is similar to that of $FePt_3$/C, with an improvement factor of greater than about 3 versus the Pt/C catalyst. This result is in agreement with the measurements obtained for the well-defined extended surfaces alluded to above. It should be noted that the activity of the Pt/C catalyst used here is over two times more active than the benchmark activity of typical Pt/C commercial catalyst. Additional insights for the Au/FePt$_3$/C nanoparticles were obtained from the electrochemical CO oxidation and cyclic voltammetry by increasing the potential to 1.7 V. A perfect match between H$_{upd}$ and CO stripping charge combined with the absence of Au redox peaks at 1.35 and 1.15 V establishes the absence of Au atoms on the surface of the core/shell particles. The electrochemical results indicate that highly efficient chemical coating of the Au substrate has produced a homogeneous multilayered Pt-bimetallic shell with an absence of Au atoms at the periphery or surface of the shell layer.

Figure 5A:
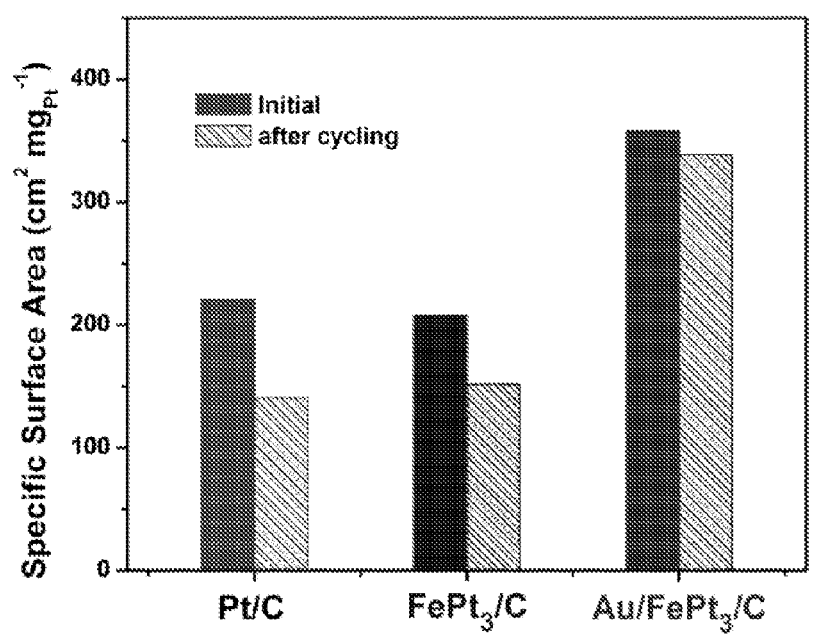
FIGS. 5A-5C are plots of specific surface areas (FIG. 5A), specific activities (FIG. 5B), and mass activities (FIG. 5C) for Pt/C, FePt$_3$/C and Au/FePt$_3$/C catalysts before cycling and after 60,000 potential cycles between 0.6 V and 1.1 V vs. RHE in oxygen saturated 0.1 M HClO$_4$ electrolyte at 20° C. with a sweep rate of 50 mV/s.
Figure 5B:
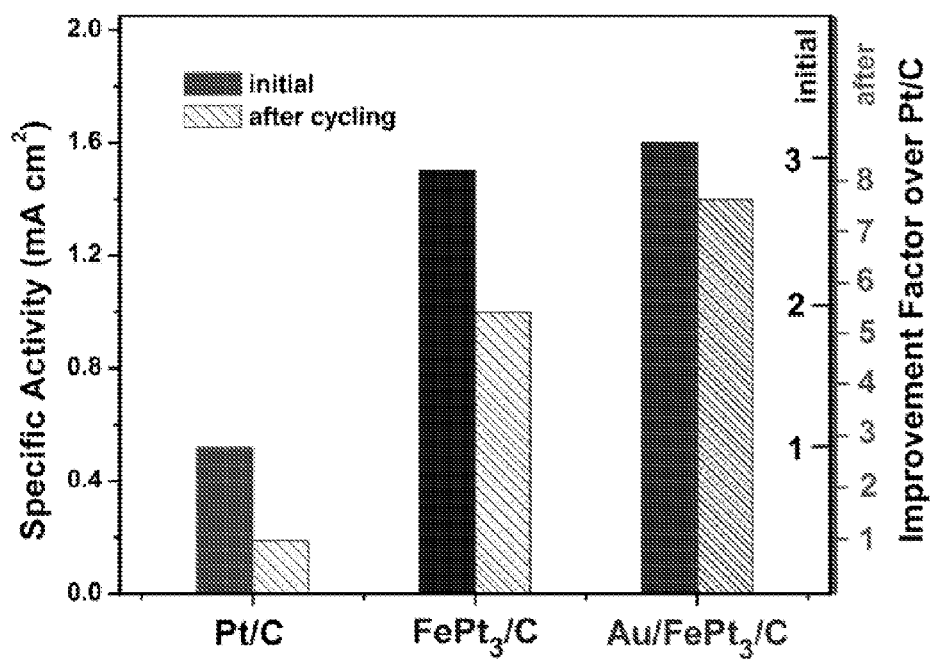
Figure 5C:
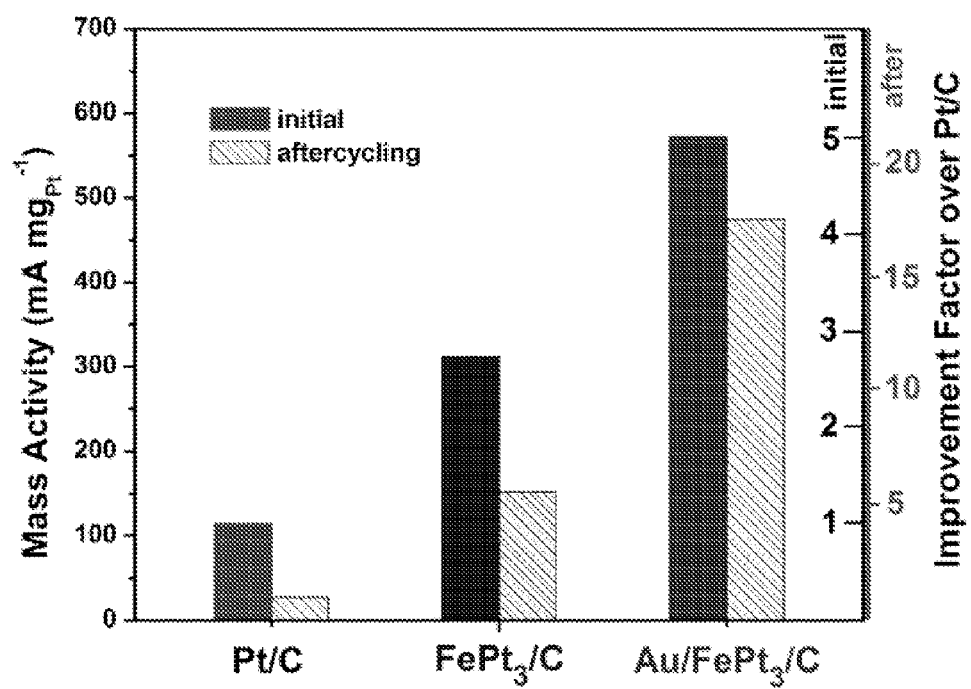

Additional electrochemical characterization was obtained from durability performance measurements performed on the materials. Various experiments were designed to reproduce the operating conditions of fuel cells and were carried out by cycling the potential between 0.6 V and 1.1 V (vs. RHE) in an oxygen saturated electrolyte. FIGS. 5A-5C present a summary of the electrochemical properties of the Au/FePt$_3$/C nanoparticle catalyst compared with the Pt/C and FePt$_3$/C nanoparticle catalysts before and after 60,000 potential cycles. No significant loss in surface area (FIG. 5A) and specific activity (FIG. 5B) was observed for Au/FePt$_3$/C, in contrast to FePt$_3$/C and Pt/C. Of particular note is that the initial specific activity of the Au/FePt$_3$/C catalyst was as high as that of FePt$_3$/C, but after cycling the activity of FePt$_3$/C catalyst dropped much more than the Au/FePt$_3$/C catalyst. The core/shell catalyst showed high catalytic durability, evidenced by, for example, seven times greater specific activity, and more than one order of magnitude greater mass activity (FIG. 5C) than the Pt/C catalyst.

Figure 6A:
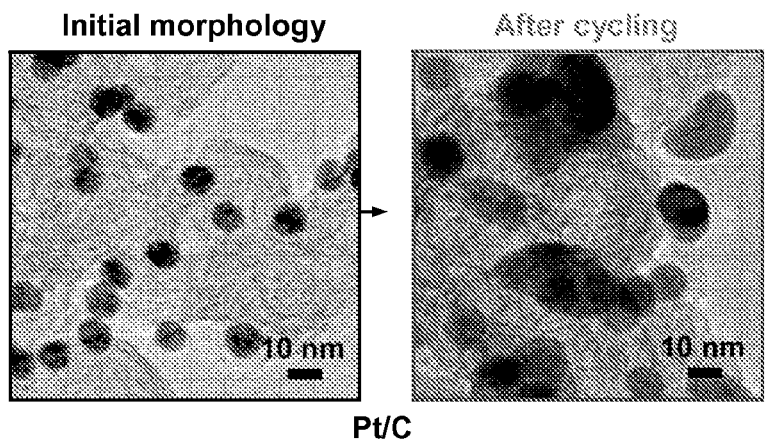
FIGS. 6A-6C are images showing TEM characterizations of the Pt/C (FIG. 6A), FePt$_3$/C (FIG. 6B) and Au/FePt$_3$/C (FIG. 6C) catalysts of FIGS. 5A-5C before cycling and after 60,000 potential cycles between 0.6 V and 1.1 V vs. RHE in oxygen saturated 0.1 M HClO$_4$ electrolyte at 20° C.
Figure 6B:
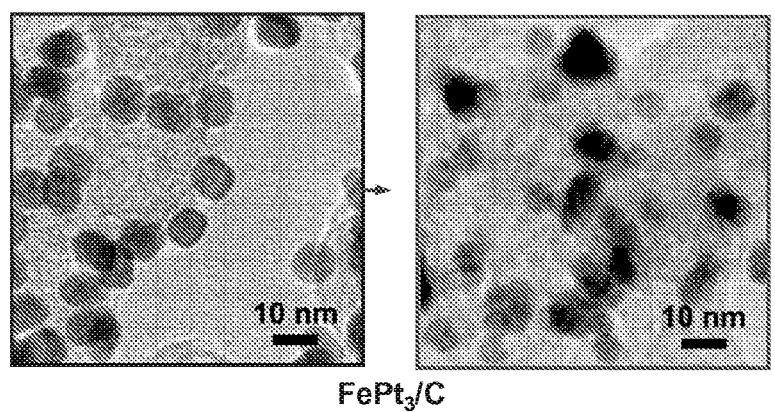
Figure 6C:
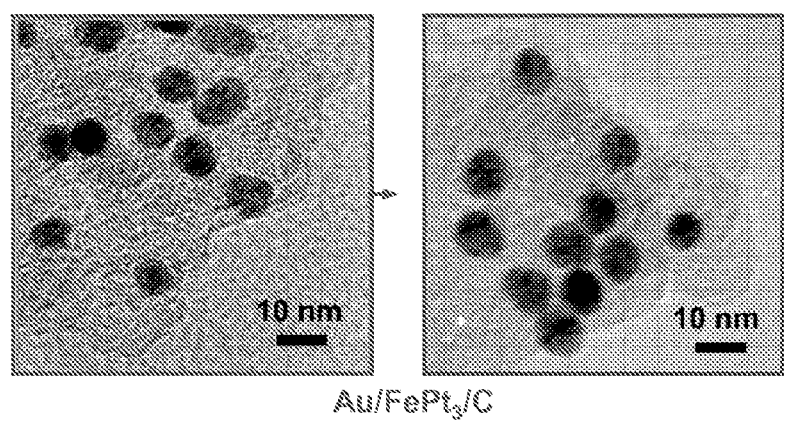

In order to understand the enhanced stability of the Au/FePt/C catalyst and get detailed insight into the degradation mechanism, TEM characterization (FIGS. 6A-6C) was performed before and after the stability studies. FIG. 6C shows no observable change in size or shape for the Au/FePt$_3$ nanoparticles before and after the 60,000 potential cycles. However, the size of the Pt (FIG. 6B) and the FePt$_3$ (FIG. 6C) nanoparticles has been substantially changed after the potential cycles. In particular, particles for the Pt and FePt$_3$ samples of over 20 nm in diameter are formed due to Ostwald ripening during electrochemical cycling. The significant morphology changes observed in the FePt$_3$/C and Pt/C catalysts directly contributes to performance decay with respect to the activity of the catalysts. In contrast, the core/shell Au/FePt$_3$ nanoparticles do not suffer from any obvious change in morphology or performance, and demonstrate high catalytic durability as an electrocatalyst for the ORR.

Because the catalytic activity of the Au/FePt$_3$/C catalysts is at the same level as FePt$_3$/C, it is not likely that the Au core affects electronic/adsorption/catalytic properties of the surface Pt atoms. This observation is consistent with observations of the thin films, i.e., the activity of the Au(111)-Pt surface does not differ from that measured on a Pt-poly surface, suggesting unchanged electronic properties of the Pt atoms at the surface. For this reason, the mechanism of stability improvement observed in the Au/FePt$_3$ system should be considered through the synergy between the particle morphology and the concentration profile within the nanoparticle. As such, it may be assumed, without limiting the scope of the embodiment, that the Au core plays a significant role in the stabilization mechanism; and the Pt atoms disposed proximate the surface are electronically altered by the subsurface Fe atoms, thereby providing high catalytic activity.

As discussed above, the Au/FePt$_3$ nanoparticles possess a substantially icosahedral shape inherited from the Au seeds. The spatial arrangement of the surface atoms in an icosahedral particle significantly diminishes the number of low-coordinated surface sites and increases the surface average coordination number compared to cubo-octahedral particles. For example, there are 12 atoms with the coordination number of 6 on an icosohedron versus 24 atoms for a cubo-octahedron. Crystal stability is highly dependent on the coordination number (the number of nearest neighbors) of the surface atoms. For example, an atom on a (111) facet has a coordination number of 9, versus 8 for (100) facets, 7 for edge sites and 6 for corner sites on a cubo-octahedral particle. These low-coordinated atoms are usually considered more vulnerable to oxidation and dissolution in an electrochemical environment. Therefore, it is reasonable to expect that the substantially icasohedral shaped Au/FePt$_3$ nanoparticles would possess higher durability than the cubo-octahedral shaped FePt$_3$ nanoparticles. Morphology control of the present Au/FePt$_3$ nanoparticles was achieved through the seed-mediated growth with the distinctive icosahedral shaped Au nanoparticle seeds. On the other hand, direct synthesis of FcPt$_3$ in the absence of Au seeds produced FePt$_3$ nanoparticles characterized by a cubo-octahedral shape, a common morphology for Pt and Pt-bimetallic catalysts.

The Au/FePt$_3$ nanoparticles demonstrate significant long-term catalytic activity improvement in a simulated fuel cell environment with respect to FePt$_3$ and Pt nanoparticles. Without limiting the scope of this embodiment, this additional complementary mechanism of durability enhancement is likely to originate from the compositional profile of the Au/FePt$_3$ nanoparticles. In accordance with surface segregation energies in transition metals, an Au enriched surface would be expected in this system. However, and unexpectedly, no trace of surface Au was found from elemental mapping and electrochemical measurements of the nanoparticles, signifying that the stable surface layer is substantially formed of Pt atoms. Beneath the surface, some interfacial alloying between the Au core and the Pt-bimetallic shell may occur in the interfacial subsurface region.

A similar divergence in surface composition from the thermodynamically favorable state has been observed for Rh/Pd core/shell nanoparticles, and has found to be strongly dependent on the nature of reactive environments. Under various electrochemical conditions, Pt is easier to oxidize than Au (see FIG. 1A), which provides the driving force for Pt atoms to remain on the surface in highly oxophilic environments. For that reason, the counterbalance between the two opposing forces, the rather strong interaction between Pt and surface oxides on one side, and the tendency for Au to segregate over Pt on the other side, may induce an additional beneficial stabilization mechanism to the surface Pt layer for Au/PtFe$_3$ nanoparticles. This observation implies that the majority of the Au atoms are located in the core of the particle, as seen in FIGS. 3A-3D. However, a certain fraction of Au, which is driven by segregation forces, diffuses and alloys with subsurface Pt and Fe atoms in the shell.

The presence of subsurface Au atoms has additional influence on the place-exchange mechanism that takes place at positive potentials for Pt catalysts between the strained Pt surface and the subsurface Pt atoms. This process is considered to be one of the precursors for Pt dissolution. However, in the case of the Au/FePt$_3$ nanoparticles the process is effectively hindered due to the presence of Au atoms in subsurface layers, i.e., Au cannot be oxidized in the given potential range that is relevant for the ORR (see FIG. 1A, potential Regions III and IV), and therefore, occurrence of Au in the subsurface layers makes the formation of subsurface oxides less energetically favorable and hence further suppresses the dissolution of Pt. A Density Functional Theory (DFT) model of subsurface atomic oxygen adsorption in Pt$_3$Fe(111) alloys further supports this configuration. When an Au atom is substituted with Pt in the subsurface layer, the strength of subsurface oxygen adsorption decreases in magnitude by about 0.15 eV. This decrease is expected to make oxygen place exchange thermodynamically less feasible, thereby reducing Pt loss in the ternary system under the Pt place-exchange dissolution mechanism.

The following non-limiting examples illustrate various aspects of catalyst preparation and characterization.

Example 1

Nanoparticle Synthesis Au nanoparticles were prepared from a solution of tetralin (10 mL), oleylamine (10 mL), and $HAuCl_4 \cdot 3H_2O$ (0.1 g) in air at 15° C. and magnetically stirred under $N_2$ flow. Tert-butylamine-borane complex (0.5 mmol) was dissolved in tetralin (1 mL) and oleylamine (1 mL) and injected into the precursor solution. The reaction initiated instantaneously and the solution changed to a deep purple color within 5 seconds. The mixture was aged at 15° C. for 1 hour before acetone (60 mL) was added to precipitate the Au nanoparticles. The Au nanoparticles, with a diameter of 7 nm, were collected by centrifugation (8500 rpm, 8 min), washed with acetone and redispersed in hexane.

Core/shell $Au/FePt_3$ nanoparticles were prepared by mixing 30 mg of the 7 nm Au nanoparticles with 10 ml octadecene, 0.1 g $Pt(acac)_2$, 1 ml oleylamine and 1 ml oleic acid at 120° C. A volume of $Fe(CO)_5$ (0.03 ml) was added under a $N_2$ atmosphere, then the temperature was raised to 200° C. The solution was cooled to room temperature after 30 minutes. 50 ml of iso-propanol was added to precipitate the nanoparticles and the product was collected by centrifuge (6000 rpm, 5 minutes). The resulting $Au/FePt_3$ nanoparticles, which had a 1.5 nm shell over the 7 nm core, were washed with ethanol and redispersed in hexane. A similar process was used, without adding Au seeds, to synthesize the 10 nm $FePt_3$ nanoparticles.

Synthesized nanoparticles were incorporated into carbon black (900 $m^2/g$), and the organic surfactants were removed by heating the nanoparticle/carbon mixture in an oxygen rich atmosphere. The total metal loading was adjusted to be 20% for all catalysts characterized.

Material Characterizations TEM images were collected on a Philips EM 420 (120 kV). HRTEM images were recorded using a Jeol JEM-2010 (200 kV). XRD patterns of the particle assemblies were collected on a Bruker AXS D8-Advance diffractometer with Cu Kα radiation (λ=1.5418 Å). UV/vis spectra were recorded on a Perkin Elmer Lambda 35 spectrometer. STEM and elemental analysis were carried out on FEI Tecnai F20ST analytical electron microscopy at Argonne National Laboratory. Additional analyses were done with JEOL 2200FS TEM/STEM at Oak Ridge National Laboratory equipped with a CEOS aberration (probe) corrector. The microscope was operated at 200 kV in high angle annual dark field (HAADF) scanning transmission electron microscopy (STEM) mode. The probe size was ~0.7 Å and probe current was ~30 pA during HAADF-STEM imaging. When accumulating EDS data, to increase probe current to ~400-500 pA, the probe size was ~2 Å. A Bruker-AXS X-Flash 5030 silicon drift detector was used as the EDS system.

Electrochemical Study The catalysts were dispersed in deionized water by sonication. A drop of the catalyst suspensions was deposited onto a glassy carbon disk (6 mm in diameter) and dried in an Ar stream. The Pt loading was 15 μg/$cm^2$ (Pt/disk) in all cases. All cyclic voltammograms and polarization curves were recorded with a sweep rate of 50 mV/s using an Autolab 302 electrochemical analyzer. Ultra pure 0.1 M perchloric acid was used as the electrolyte. The prolonged potential cycling was done at 20° C. in order to diminish the influence of contaminants and electrolyte evaporation, which could be significant at elevated temperatures. All potentials are given versus reversible hydrogen electrode (RHE).

Theory and Simulations The DACAPO code was used for all total energy calculations. A four-layer slab, periodically repeated in a super cell geometry with six equivalent layers of vacuum between any two successive metal slabs, was used; the RPBE 1-optimized $Pt_3Fe$ lattice constant was 3.96 Å. A (2×2) unit cell was employed. The top two layers of the slab were allowed to relax until the total force on all atoms was less than 0.04 eV/A in any Cartesian direction. Adsorption was allowed on one of the two exposed surfaces of the metal slabs, and the electrostatic potential was adjusted accordingly. Ionic cores were described by ultrasoft pseudopotentials, and the Kohn-Sham one-electron valence states were expanded in a basis of plane waves with kinetic energy below 340 eV; a density cutoff of 500 eV was used. The surface Brillouin zone was sampled with an 18 Chadi-Cohen k point grid. The convergence of the total energy with respect to the cut-off energies and the k point set was confirmed. The exchange-correlation energy and potential were described by the generalized gradient approximation (GGA-RPBE). The self-consistent RPBE density was determined by iterative diagonalization of the Kohn-Sham Hamiltonian, Fermi population of the Kohn-Sham states (kBT=0.1 eV), and Pulay mixing of the resulting electronic density. All total energies were extrapolated to kBT=0 eV.

Example 2

Core/shell $Au/FePt_3$ nanoparticles with a shell thickness of less 1.0 nm were prepared. 30 mg of the 7 nm Au nanoparticles obtained using the process of Example 1 were mixed with 10 ml of octadecene, 0.05 g $Pt(acac)_2$, 1 ml oleylamine and 1 ml oleic acid at 120° C. A volume of $Fe(CO)_5$ (0.015 ml) was added under a $N_2$ atmosphere, then the temperature was raised to 180° C. The solution was cooled to room temperature after 30 minutes. 50 ml of iso-propanol was added to precipitate the nanoparticles and the product was collected by centrifuge (6000 rpm, 5 minutes). The resulting $Au/FePt_3$ nanoparticles had a shell of less than 1.0 nm over the 7 nm core. The particles showed characteristic gold features in the CV when the upper potential limit was opened to 1.65 V, indicating that the Pt bimetallic shell did not completely encapsulate the Au core.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. An electrocatalyst having catalytic properties in a fuel-cell environment, comprising:
   a surface area substrate;
   a plurality of nanoparticles dispersed on the surface area substrate, each of the plurality of nanoparticles characterized by a substantially icosahedral shape and comprising:
      a core portion, the core portion comprising a gold nanoparticle; and
      a Pt-bimetallic shell portion fully encasing the core portion, the Pt-bimetallic shell portion comprising platinum and a second metal configured to modify both a catalytic durability of the nanoparticle and a catalytic activity of the nanoparticle,
   wherein the surface of the bimetallic shell is substantially free of gold.

2. The electrocatalyst of claim 1, further comprising an interfacial portion disposed between the core portion and the Pt-bimetallic shell portion, the interfacial portion comprising an alloy of gold and a bimetallic shell material.

3. The electrocatalyst of claim 2, wherein the plurality of nanoparticles have an atomic composition of less than about 55% platinum.

4. The electrocatalyst of claim 1, wherein the Pt-bimetallic shell portion forms an epitaxial coating over the core portion.

5. The electrocatalyst of claim 1, wherein a surface layer of the Pt-bimetallic shell portion consists essentially of platinum.

6. The electrocatalyst of claim 5, wherein the second metal comprises iron and wherein the surface layer is electronically altered by the iron to increase the catalytic activity of the surface layer.

7. The electrocatalyst of claim 5, wherein the core portion comprises a shape configured to suppress dissolution of the platinum from the surface layer in an oxygen reduction reaction environment.

8. The electrocatalyst of claim 1, wherein the electrocatalyst is integrated into a cathode of a fuel cell.

9. A method for forming a plurality of durable core/shell particles having catalytic activity, comprising:
   providing an amount of gold nanoparticles;
   reacting an amount of a platinum precursor to obtain platinum;
   reacting an amount of an alloying metal precursor to obtain an alloying metal, the alloying metal selected to enhance the catalytic activity of the durable core/shell particles;
   heating a mixture of the platinum, the alloying metal and the plurality of gold nanoparticles; and
   cooling the mixture to precipitate a plurality of nanoparticles, each of the plurality of nanoparticles characterized by a core portion and a shell portion substantially enveloping the core portion,
   wherein the platinum and the alloying metal are preferentially disposed in the shell portion of each of the plurality of nanoparticles.

10. The method of claim 9, wherein each of the plurality of nanoparticles is further characterized by a surface portion enveloping the shell portion, the topmost surface portion consisting essentially of platinum.

11. The method of claim 9, further comprising adjusting at least one of the amounts of the gold nanoparticles, the platinum precursor and the alloying metal precursor to selectively define the thickness of the shell portion.

12. The method of claim 11, wherein the thickness of the shell portion is substantially uniform and between about 1.0 nm and about 1.5 nm.

13. The method of claim 9, further comprising incorporating the plurality of nanoparticles into a carbon substrate for use in a fuel cell.

14. The method of claim 9, wherein the alloying metal is selected from the group consisting of: Fe, Co and Ni.

* * * * *